US00RE43852E

(19) United States
(12) Reissued Patent
Lee et al.

(10) Patent Number: US RE43,852 E
(45) **Date of Reissued Patent: *Dec. 11, 2012**

(54) METHOD AND COMMUNICATION SYSTEM FOR IDENTIFYING CALLING/CALLED PARTY

(75) Inventors: Jin Soo Lee, Seoul (KR); Yong Kyoung Shin, Seoul (KR)

(73) Assignee: LG Electronics Inc., Seoul (KR)

( * ) Notice: This patent is subject to a terminal disclaimer.

(21) Appl. No.: 13/020,319

(22) Filed: Feb. 3, 2011
(Under 37 CFR 1.47)

Related U.S. Patent Documents

Reissue of:
(64) Patent No.: 7,499,528
Issued: Mar. 3, 2009
Appl. No.: 11/069,384
Filed: Feb. 28, 2005

U.S. Applications:
(63) Continuation of application No. 12/859,175, filed on Aug. 18, 2010.

(30) Foreign Application Priority Data

Mar. 2, 2004 (KR) ..... 10-2004-0013939

(51) Int. Cl.
*H04M 3/42* (2006.01)
*H04M 1/64* (2006.01)
*H04N 7/18* (2006.01)

(52) U.S. Cl. ..... 379/88.19; 187/247; 345/428; 348/143; 348/333.12; 358/453; 370/352; 379/88.13; 379/93.35; 379/142.06; 379/142.15; 379/202.01; 382/224; 455/415; 705/7.32; 705/14.52

(58) Field of Classification Search ..... 379/88.13, 379/88.19, 93.35, 142.06, 142.15, 202.01; 455/415; 187/247; 345/428; 348/143, 333.12; 358/453; 370/352; 382/224; 705/7.32, 14.52
See application file for complete search history.

(56) References Cited

U.S. PATENT DOCUMENTS

| | | | |
|---|---|---|---|
| 4,533,943 | A | 8/1985 | Poirier |
| 4,715,059 | A | 12/1987 | Cooper-Hart et al. |
| 4,943,994 | A | 7/1990 | Ohtsuka et al. |
| 4,962,521 | A | 10/1990 | Komatsu et al. |
| 4,995,073 | A | 2/1991 | Okata et al. |
| 5,018,186 | A | 5/1991 | Kimura et al. |
| 5,042,061 | A | 8/1991 | Kaneko et al. |
| 5,073,927 | A | 12/1991 | Grube |

(Continued)

FOREIGN PATENT DOCUMENTS

| | | | |
|---|---|---|---|
| CN | 1413409 | A | 4/2003 |

(Continued)

*Primary Examiner* — Gerald Gauthier
(74) *Attorney, Agent, or Firm* — Birch, Stewart, Kolasch & Birch, LLP

(57) ABSTRACT

A method and communication system is provided to identify a calling/called party when the call is being set up but before the call is answered. In the method, a first terminal and a second terminal are respectively provided with opposing terminal's image data before the call is answered. The image data of the first and second terminals can be registered in a media server disposed between the first and second terminals, and the image data can be transmitted between the first terminal and the media server and between the second terminal and the media server in accordance with an SIP protocol.

11 Claims, 3 Drawing Sheets

U.S. PATENT DOCUMENTS 5,146,349 A 9/1992 Mori
5,412,418 A 5/1995 Nishimura et al.
5,586,171 A 12/1996 McAllister et al.
5,606,365 A 2/1997 Maurinus et al.
5,608,788 A 3/1997 Demlow et al.
5,640,195 A 6/1997 Chida
5,715,301 A 2/1998 Terasaki et al.
H1714 H 3/1998 Partridge, III
5,771,065 A 6/1998 Hijikata et al.
5,818,606 A 10/1998 Muramatsu et al.
5,875,239 A * 2/1999 Koralewski et al. ..... 379/142.15
5,890,071 A 3/1999 Shimanuki
5,898,824 A 4/1999 Kato et al.
5,907,604 A * 5/1999 Hsu ..... 379/142.06
5,930,818 A 7/1999 Suu et al.
5,999,599 A 12/1999 Shaffer et al.
6,167,469 A 12/2000 Safai et al.
6,185,433 B1 2/2001 Lele et al.
6,192,257 B1 2/2001 Ray
6,198,738 B1 3/2001 Chang et al.
6,226,367 B1 5/2001 Smith et al.
6,243,448 B1 * 6/2001 Corbett et al. ..... 379/93.35
6,269,094 B1 7/2001 Lecomte et al.
6,272,126 B1 8/2001 Strauss et al.
6,509,924 B2 1/2003 Honguu et al.
6,529,742 B1 3/2003 Yang
6,600,508 B2 7/2003 Nakade et al.
6,654,725 B1 * 11/2003 Langheinrich et al. .... 705/14.52
6,665,442 B2 * 12/2003 Sekiguchi et al. ..... 382/224
6,695,206 B2 2/2004 Ross
6,810,115 B2 10/2004 Fukuda
6,865,386 B2 3/2005 Aoyama et al.
6,870,917 B2 3/2005 Chen et al.
6,876,734 B1 * 4/2005 Summers et al. ..... 379/202.01
6,981,275 B1 12/2005 Maeda et al.
6,990,480 B1 * 1/2006 Burt ..... 1/1
7,031,746 B2 4/2006 Na et al.
7,065,197 B1 6/2006 Ramella-Pezza et al.
7,085,253 B2 8/2006 Yang
7,088,802 B2 8/2006 Light et al.
7,091,974 B2 * 8/2006 Masera et al. ..... 345/428
7,092,735 B2 8/2006 Osann, Jr.
7,113,577 B2 9/2006 Cook et al.
7,127,271 B1 10/2006 Fujisaki
7,130,296 B2 10/2006 McNiff et al.
7,155,211 B2 12/2006 Mun et al.
7,174,163 B2 2/2007 Aksu et al.
7,177,627 B2 2/2007 Melaku et al.
7,180,991 B2 2/2007 Dhara et al.
7,239,338 B2 7/2007 Krisbergh et al.
7,248,677 B2 7/2007 Randall et al.
7,272,134 B2 9/2007 Iwama et al.
7,272,419 B1 9/2007 Schutze et al.
7,301,661 B2 11/2007 Sagiya et al.
7,313,227 B2 * 12/2007 Jones ..... 379/88.13
7,419,032 B2 * 9/2008 Yamakawa ..... 187/247
7,423,770 B2 9/2008 Ogura et al.
7,443,416 B2 10/2008 Berenguer
7,493,138 B2 2/2009 Nagatomo et al.
7,499,528 B2 * 3/2009 Lee et al. ..... 379/88.19
7,523,086 B1 * 4/2009 Teague et al. ..... 1/1
7,536,178 B2 5/2009 Paik et al.
7,543,246 B2 6/2009 Mifune
7,576,770 B2 * 8/2009 Metzger et al. ..... 348/143
7,613,450 B2 11/2009 Krischker et al.
7,623,186 B2 11/2009 Seong
7,634,731 B2 12/2009 Lee
7,643,168 B2 1/2010 Monroe
7,643,619 B2 1/2010 Jung
7,660,404 B2 2/2010 Min et al.
7,738,886 B1 6/2010 Connolly et al.
7,760,711 B1 * 7/2010 Kung et al. ..... 370/352
2003/0032413 A1 * 2/2003 Aksu et al. ..... 455/415
2003/0055981 A1 3/2003 Requena et al.
2003/0095650 A1 5/2003 Mize
2003/0103247 A1 * 6/2003 Masera et al. ..... 358/453
2003/0139172 A1 7/2003 Lampela et al.
2003/0149641 A1 * 8/2003 Kouketsu et al. ..... 705/27
2004/0032503 A1 2/2004 Monden et al.
2004/0055011 A1 3/2004 Bae et al.
2004/0091090 A1 5/2004 Hong et al.
2004/0101046 A1 5/2004 Yang et al.
2004/0165703 A1 * 8/2004 Jones ..... 379/88.13
2004/0169759 A1 * 9/2004 Kikuchi ..... 348/333.12
2004/0209644 A1 10/2004 Chang et al.
2005/0032507 A1 2/2005 Na et al.
2005/0143053 A1 6/2005 Virtanen et al.
2005/0146599 A1 7/2005 Whited et al.
2005/0169446 A1 8/2005 Randall et al.
2005/0195950 A1 * 9/2005 Lee et al. ..... 379/88.19
2006/0020991 A1 1/2006 Goto
2006/0159247 A1 7/2006 Krembs
2006/0258396 A1 11/2006 Matsuoka
2006/0268349 A1 11/2006 Tamura
2007/0091832 A1 4/2007 Lee
2008/0045184 A1 2/2008 Randall et al.
2011/0273540 A1 11/2011 Lee et al.

FOREIGN PATENT DOCUMENTS

EP 0741484 11/1996
EP 0741484 A2 11/1996
WO WO 0217602 2/2002
WO WO 0217602 A1 2/2002

* cited by examiner

METHOD AND COMMUNICATION SYSTEM FOR IDENTIFYING CALLING/CALLED PARTY

Matter enclosed in heavy brackets [ ] appears in the original patent but forms no part of this reissue specification; matter printed in italics indicates the additions made by reissue.

*This application is a new Reissue Continuation Application of U.S. Reissue application Ser. No. 12/859,175 filed Aug. 18, 2010, which is a reissue application of U.S. Pat. No. 7,499,528B2 issued on Mar. 3, 2009, which claims foreign priority benefits of Korean Patent Application No. 10-2004-0013939 filed Mar. 2, 2004 in Republic of Korea. The entire contents of each of the above-identified applications are hereby incorporated by reference. Notice: More than one reissue application has been filed for the reissue of U.S. Pat. No. 7,499,528B2. The reissue applications are application Ser. No. 12/859,175 filed Aug. 18, 2010, application Ser. No. 12/859,201 filed Aug. 18, 2010, application Ser. No. 12/859,207 filed Aug. 18, 2010, application Ser. No. 12/859,216 filed Aug. 18, 2010, application Ser. No. 12/859,225 filed Aug. 18, 2010, and the present application.*

BACKGROUND OF THE INVENTION

1. Field of the Invention

The present invention relates to a communication system, and more particularly, to a method and communication system for identifying a calling/called party (sender/caller or recipient) before calling or answering.

2. Description of the Related Art

Various methods of identifying the calling/called party are being introduced.

There is a well-known method of transmitting the caller's phone number to the recipient's terminal during the ringing signal or when the call is being set up but before the call is answered, such that the recipient can see the caller's phone number on the terminal display. However, if the recipient does not know the phone number, the recipient cannot identify the caller.

In another method, caller's name, avatar/image as well as the caller's phone number, which are previously stored in the recipient's terminal, are displayed on the terminal display. However, the recipient cannot also identify the caller with this method when the caller's name and avatar/image are not stored in the recipient terminal.

SUMMARY OF THE INVENTION

Accordingly, the present invention is directed to a method and communication system for identifying a calling/called party that substantially obviates one or more problems due to limitations and disadvantages of the related art.

An object of the present invention is to provide a method and communication system for identifying a calling/called party, in which image data of a calling party can be transmitted to a called party without adding additional software and hardware, thereby decreasing manufacturing and operating costs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of identifying a calling/called party includes the steps of: registering image data of a calling party in a first terminal; transmitting the image data and a call request of the first terminal to a second terminal via a media server; and displaying the image data of the calling party on the second terminal.

In another aspect of the present invention, there is provided a method of identifying a calling/called party, including the steps of: registering image data of calling party and called party in a media server in accordance with a call condition; transmitting a call request and an image data forwarding request of a first terminal to the media server; transmitting the registered image data of the calling party from the media server to a second terminal in response to the image data forwarding request; and displaying the image data of the calling party on the second terminal.

In a further another aspect of the present invention, there is provided a communication system for identifying a calling/called party, including: a first terminal having a communication unit for requesting a call, an SIP system for transmitting image data of a calling party and receiving image data of a called party, a display for displaying the image data of the called party, and an image database for registering the image data of the calling party; a media server having an SIP system for transmitting the image data of the calling party received from the first terminal to the called party and transmitting the image data of the called party to the first terminal, an image database for registering the image data of the called party in accordance with a call condition, and means for selecting one of the image data of the called party corresponding to the call condition; and a second terminal having a communication unit for responding to the call requested from the first terminal to open a communication channel with the first terminal, an SIP system for receiving the image data of the calling party from the first terminal, and a display for displaying the image data of the calling party.

In a still further another aspect of the present invention, there is provided a communication system for identifying a calling/called party, including: a first terminal having a communication unit for requesting a call, an SIP system for transmitting an image data forwarding request of a calling party and receiving image data of a called party, and a display for displaying the image data of the called party; a media server having an SIP system for transmitting the image data of the calling party to the called party in response to the image data forwarding request and transmitting the image data of the called party to the first terminal, an image database for registering the image data in accordance with a call condition, and means for selecting one of the image data of the called party corresponding to the call condition; and a second terminal having a communication unit for responding to the call requested from the first terminal to open a communication channel with the first terminal, an SIP system for receiving the image data of the calling party from the first terminal, and a display for displaying the image data of the calling party.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
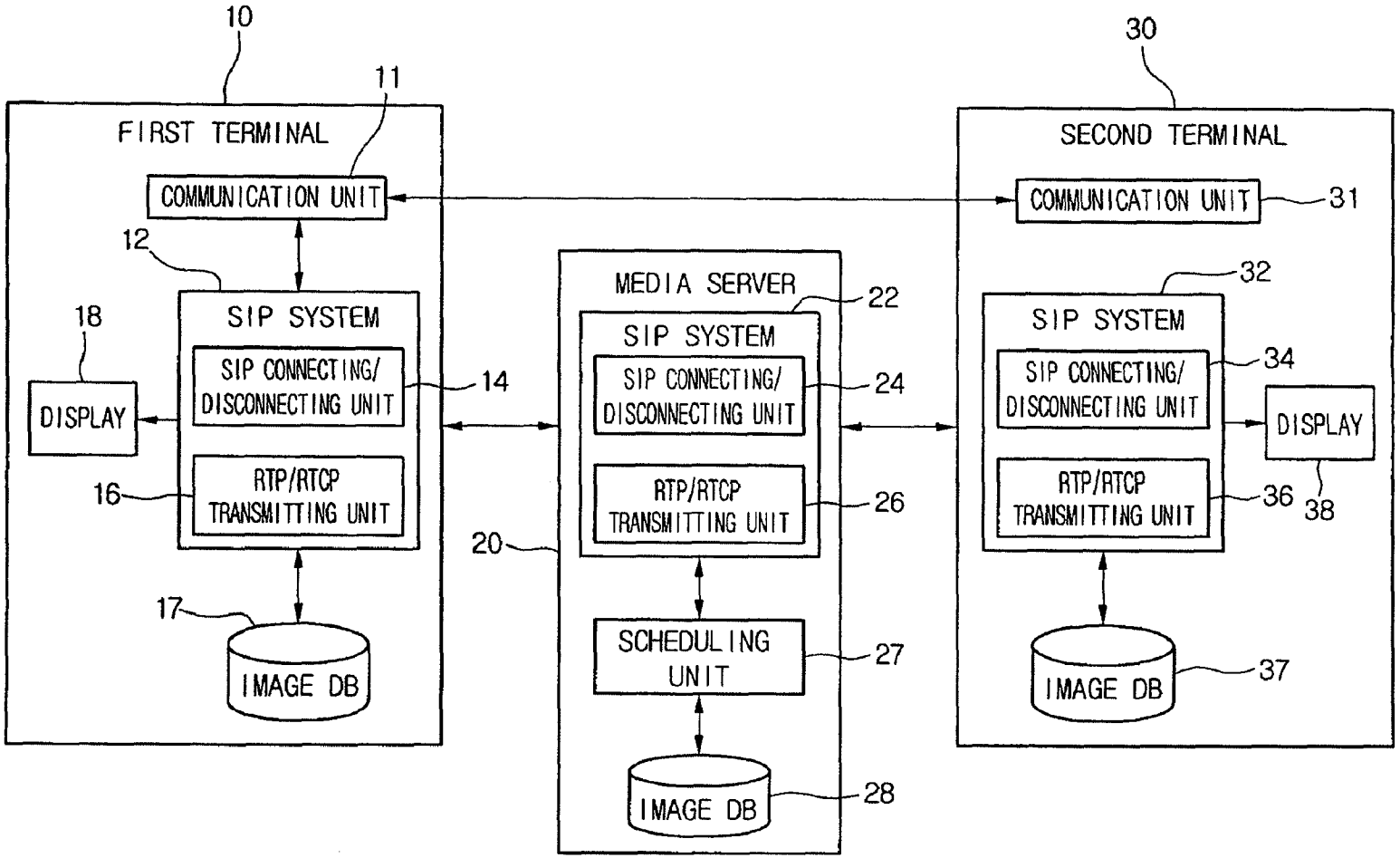
FIG. 1 is a block diaphragm of a communication system according to a preferred embodiment the present invention.

FIG. 1 is a block diaphragm of a communication system according to a preferred embodiment the present invention;

Referring to FIG. 1, an communication system includes: a first and second terminals 10 and 30 for making a call and answering the call; and a media server 20 for transmitting image data of the calling party to the called party, transmitting image data of the called party to the calling party, and storing the image data.

The image data can be any kind of picture or character, such as an avatar, a still picture, a moving picture, and a text so long as the calling party and called party can be identified with the image data. The avatar is an image of a person used to represent somebody, and it is available from the Internet. The still picture and moving picture can be stored using a camera of a terminal. The text can be used to identify the calling party or the called party instead of the avatar or the pictures. For example, the text may include personal information such as physical and characteristic information.

Both the first terminal 10 and the second terminal 30 are capable of making and answering a call. Therefore, the first terminal 10 may be a calling terminal and the second terminal 30 answering terminal, and vice versa.

In the embodiments of the present invention, the first terminal 10 is illustrated as a calling terminal and the second terminal 30 is illustrated as an answering terminal.

The elements of the first terminal 10 and the second terminal are similar. That is, the first and second terminals 10 and 30 may include communication units 11 and 31, session initiation protocol (SIP) systems 12 and 32, image databases 17 and 37, and displays 18 and 38, respectively.

Each of the communication units 11 and 31 is capable of requesting a call and accepting a call request. For example, when the calling party requests a call with the communication unit 11 of the first terminal 10, the communication unit 31 of the second terminal 30 receives the requested call and generates a ringing signal or activates a vibration mechanism for the called party. If the called party accepts the requested call, the communication unit 31 sends a call-accepting message to the communication unit 11 to open a communication channel between the first terminal 10 and second terminal 30. That is, the communication units 11 and 31 are provided to request a call, accept the call, and open/close the communication channel.

A base station, a mobile switching center, and other stations (not shown in FIG. 1) may be located between the communication unit 11 and the communication unit 31 for the communication therebetween. The call requested at the communication unit 11 may be transmitted to the communication unit 31 via the base station, the mobile switching center, and other stations. Also, the call-accepting message at the communication unit 31 may be transmitted to the communication unit 11 via the base station, the mobile switching center, and other stations.

The SIP systems 12 and 32 set and release SIP channel connections. Also, the SIP systems 12 and 32 send data to the other locations and receive receipt notification messages from the other locations. For this purpose, the SIP systems 12 and 32 may include SIP connection setup/release units 14 and 34, and real time transport protocol/real time control protocol (RTP/RTCP) transmitting units 16 and 36, respectively.

The SIP connection setup/release units 14 and 34 are provided to set SIP channel connections between the first terminal 10 and the media server 20 and between the second terminal 30 and the media server 20 before opening RTP/RTCP channels therebetween. That is, the RTP/RTCP channels are opened after the SIP channel connections are set. Therefore, the first terminal 10 can transmit RTP data (e.g., avatar data of the calling party) to the media server 20, and the second terminal 30 can receive the avatar data of the calling party from the media server 20. Also, the first terminal 10 can receive a receipt notification message (e.g., a BYE message) from the media server 20 after transmitting the avatar data of the calling party to the media server 20, and the media server 20 can receive a receipt notification message from the second terminal 30 after transmitting the avatar data of the calling party to the second terminal 30.

After this communication operation, the SIP connection setup/release units 14 and 34 release the SIP channel connections.

Preferably, the SIP systems 12 and 32 operate in association with the communication units 11 and 31. That is, the SIP system 12 operates when the communication unit 11 sends the call request to the communication unit 31. Also, the SIP system 32 operates to receive the avatar data of the calling party from the media server 20 when the communication unit 31 receives the call request.

The SIP system 12 operates at the same time when the communication unit 11 sends the call request. Foremost, the SIP connection setup/release unit 14 of the SIP system 12 sets the SIP channel connection to connect the first terminal 10 with the media server 20.

Then, the RTP/RTCP transmitting unit 16 transmits the avatar data according to the following ways:

In one way, the avatar data registered in the first terminal 10 are transmitted to the second terminal 30 through the media server 20 in accordance with the RTP protocol.

In another way, the avatar data of the calling party are previously registered in the media server 20, and the media server 20 transmits the avatar data to the called party in accordance with the RTP protocol when requested to send the avatar data to the called party.

The former will now be more fully described and the latter will be described later in association with the media server 20.

The avatar data may be registered in the image database 17 of the first terminal 10. It will be apparent to those of skill in the art that the avatar data include still picture data, moving picture data, text data, etc., as well as the avatar data. Meanwhile, the image database 37 of the second terminal 30 is not necessary in this way because the avatar data of the called party are already registered in the media server 20.

Further, another avatar data of another called party may be registered in the image database 17 if the first terminal 10 have requested a call at least one time to the another called party.

The RTP/RTCP transmitting unit 16 reads the avatar data of the calling party from the image database 17 and transmits the avatar data to the media server 20 through the RTP channel. The media server 20 transmits the received avatar data to the second terminal 30 for displaying the avatar data on the display 38 of the second terminal 30.

Herein, the media server 20 sends a receipt notification message (e.g., a BYE message) to the first terminal 10 through the RTCP channel the time when the media server 20 receives the avatar data of the calling party from the first terminal 10. Therefore, the first terminal 10 can be informed that the avatar data are successfully transmitted to the media server 20.

When the avatar data of the calling party are displayed on the display 38 of the second terminal 30, the display 18 of the first terminal 10 displays the avatar data of the called party received from the media server 20.

The display of avatar data of the called party on the display 18 of the first terminal 10 will be more fully described later when the overall operation of the communication system of the present invention is described.

The second terminal 30 has the similar configuration to the first terminal 10. Since the second terminal 30 is illustrated as an answering terminal, the avatar data of the calling party are displayed on the display 38 of the second terminal 30.

In case the second terminal 30 is a calling terminal, an avatar data registered in the image database 37 of the second terminal 30 may be transmitted to the first terminal 10 to display the avatar data on the display 18.

The media server 20 may include an SIP system 22, a scheduling unit 27, and an image database 28.

In case the avatar data of the calling party are registered in the first terminal 10, the avatar data of the calling party may not be registered in the image database 28 of the media server 20. In this case, the avatar data of the calling party may be transmitted from the first terminal 10 to the second terminal 30 via the media server 20. The media server 20 may temporarily store the avatar data of the calling party during transmission of the avatar data of the calling party, and the temporarily stored avatar data may be deleted or not deleted after the transmission.

The SIP system 22 of the media server 20 is compatible with the SIP systems 12 and 32 of the first and second terminals 10 and 30. The SIP system 22 may include an SIP connection setup/release unit 24 and an RTP/RTCP transmitting unit 26 to correspond with the SIP systems 12 and 32.

When the SIP connection setup/release unit 14 sends an SIP channel connection request to the media server 20, the media server 20 accepts the request and sets the SIP channel connection with the first terminal 10. Through the SIP channel, the first terminal 10 can send the avatar data of the calling party (RTP data) to the media server 20, and the media server 20 can send the receipt notification message (e.g., a BYE message) to the first terminal 10 in response to the received avatar data.

The scheduling unit 27 and the image database 28 may be provided to register the avatar data of the calling/called party.

The calling and called parties can register different avatar data for different call conditions.

For example, the called party can register different avatar data in the image database 28 for different call conditions, such as when ready to receive a call, receiving another call, has the terminal 30 powered off, and incapable of receiving a call (e.g., when in a theater, a meeting, or a bathroom).

The scheduling unit 27 checks the call condition of the called party and selects one of the avatar data corresponding to the checked call condition. Also, other data such as identifiers, phone numbers, as well as the avatar data can be registered in the image database 28 for both the calling and called parties.

In this manner, the avatar data are registered and set according to the call condition. Therefore, when the first terminal 10 sends a call request and an avatar data forwarding request, the media server 20 searches the avatar data of the image database 28 according to the identifier or phone number of the calling party to find an avatar corresponding to the calling party and sends the avatar to the second terminal 30, such that the avatar of the calling party can be displayed on the display 38 of the second terminal 30.

Further, the media server 20 checks the call condition of the second terminal 30, selects an avatar corresponding to the call condition form the image database 28, and sends the avatar to the first terminal 10 for displaying on the display 18.

Hereinafter, a method of identifying a calling/called party will now be described. There are two ways of transmitting the avatar data: one way is to transmit the avatar data that are registered in the terminal 10 or terminal 30, and another way is to transmit the avatar data that are previously registered in the media server 20.

Figure 2:
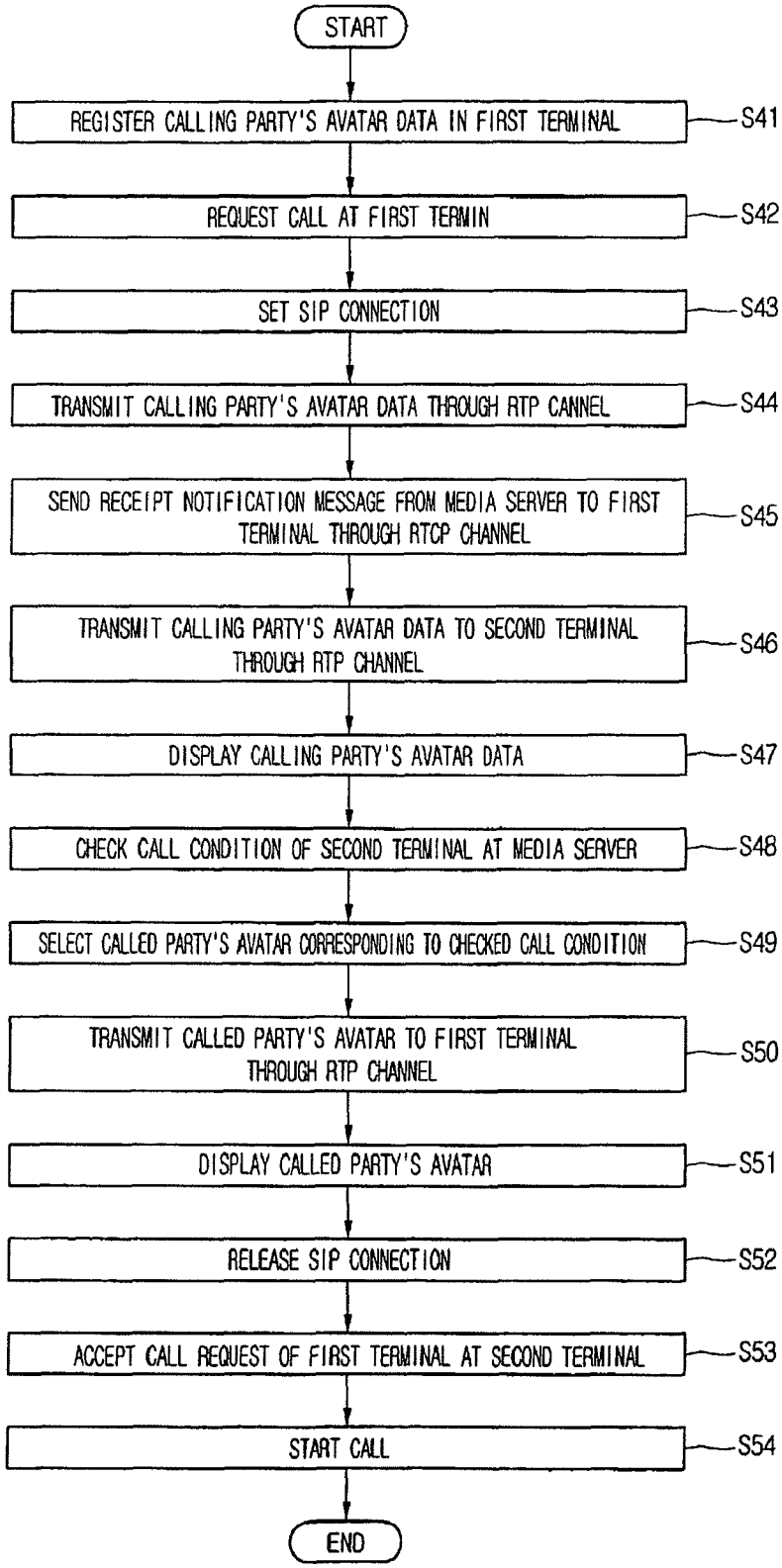
FIG. 2 is a flowchart showing a method of transmitting an avatar data registered in a terminal according to a preferred embodiment of the present invention.

FIG. 2 is a flowchart showing a method of transmitting an avatar data registered in a terminal according to a preferred embodiment of the present invention; and Referring to FIGS. 1 and 2, avatar data of the calling party are registered in the image database 17 of the first terminal 10 in operation S41. Herein, the avatar data of the calling party are not registered in the media server 20. The avatar data may include still picture data, moving picture data, text data, as well as avatar data. The avatar data are image data representing a person and it is available from the Internet. Also, the still picture and moving picture data may be picture data of the calling party taken with a camera such as a built-in camera of the terminal 10. Information about the calling party may be contained in the text data to represent the calling party. The calling party can register one of the avatar data, the still picture data, the moving picture data, the text data, and a combination thereof.

In operation S42, the first terminal 10 of the calling party transmits a call request to the second terminal 30 of the called party. The way of the call request is well known in the art.

In operation S43, the SIP channel connection is set between the first terminal 10 and the media server 20. After the SIP channel is set, data and control signals can be transmitted between the first terminal 10 and the media server 20.

In operation S44, the first terminal 10 transmits the avatar data of the calling party from the image database 17 to the media server 20 through the RTP channel in the form of packet.

In operation S45, the media server 20 sends a receipt notification message (e.g., a BYE message) to the first terminal 10 through the RTCP channel when the media server 20 receives the avatar data of the calling party.

In operation S46, the media server 20 transmits the received avatar data of the calling party to the second terminal 30 through the RTP channel between the media server 20 and the second terminal 30. After the avatar data of the calling party are transmitted to the second terminal 30, the avatar data may be deleted from the media server 20. The RTP and RTCP channels are opened between the media server 20 and the second terminal 30 before the avatar data of the calling party are transmitted to the second terminal 30. The called party can open the RTP and RTCP channels by manipulating the second terminal 30, for example, pressing an "ON" button.

In operation S47, the second terminal 30 displays the received avatar data of the calling party. Therefore, the called party of the second terminal 30 can exactly identify the calling party through the displaying avatar data. The second terminal 30 may register the received avatar data of the calling party in the image database 37 to display the registered avatar data instead of repeatedly receiving the avatar data from the first terminal 10 when the first terminal 10 requests a call again.

In operation S48, the media server 20 asks the second terminal 30 for a call condition through the RTCP channel, and correspondingly the second terminal 30 sends its call condition to the media server 20 through the RTCP channel, such that the media server 20 can check the call condition of the second terminal 30.

When the calling party makes a call to the called party, the called party may be in various situations such as when ready to receive a call, receiving another call, being on duty, and incapable of receiving a call. Also, the second terminal 30 of the called party may be power-off or incapable of receiving a call. The term "call condition(s)" is used to denote such situations and conditions. That is, when the media server 20 asks the second terminal 30 for the call condition, the second terminal 30 may inform the media server 20 of its call condition among such situations and conditions. The call condition checking operation is well known to those of skill in the art.

In operation S49, the media server 20 selects an avatar of avatar data of the called party corresponding to the checked call condition from the image database 28. For this operation, the called party can register avatar data having different avatars, pictures and texts in image database 28 of the media server 20 for different call conditions. Also, since the calling party of the first terminal 10 can be a called party, the calling party of the first terminal 10 can register his/her avatar data in the image database 28 for different call conditions.

In operation S50, the media server 20 transmits the selected avatar of the called party to the first terminal 10 through the RTP channel.

In operation S51, the first terminal 10 displays the received avatar of the called party. The first terminal 10 may register the received avatar of the called party in its image database 17 for later usage, for the same purpose as is described in operation S47.

In operation S52, the SIP channel connection between the 10 and the media server 20 is released.

Therefore, each of the calling party and the called party can see the avatar of the opposing party when making and answering a call, thereby exactly identifying the opposing party.

If the second terminal 30 accepts the call request of the first terminal 10 in operation S53, communication channel between the first and second terminals 10 and 30 is open for the communication therebetween in operation S54.

After the communication between the terminals 10 and 30, the communication channel is closed as is well known in the art.

Figure 3:
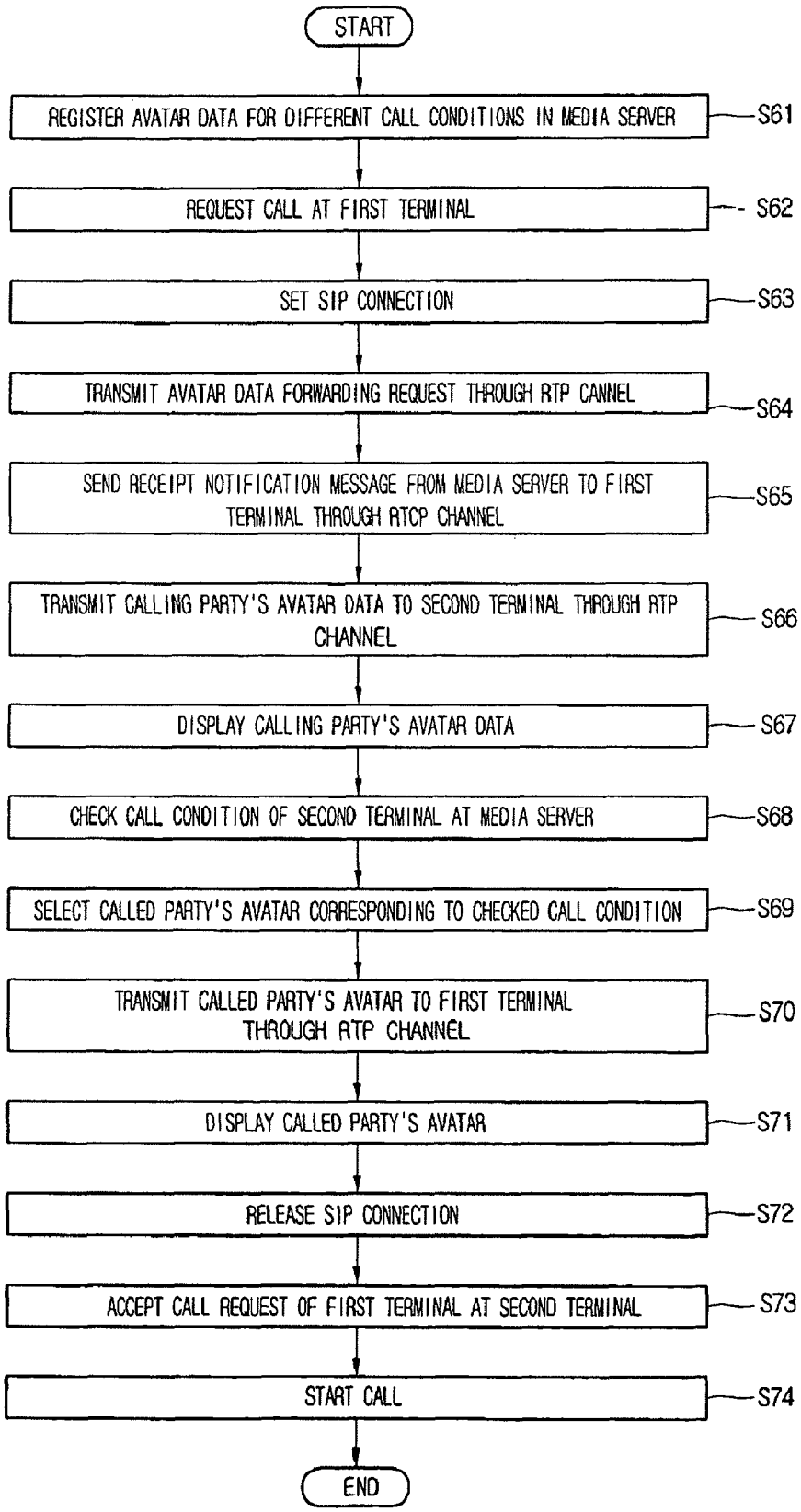
FIG. 3 is a flowchart showing a method of transmitting an avatar data registered in a media server according to a preferred embodiment of the present invention.

FIG. 3 is a flowchart showing a method of transmitting an avatar data previously registered in a media server according to a preferred embodiment of the present invention.

Referring to FIGS. 1 and 3, avatar data for different call conditions are registered in the media server 20 in operation S61. Both the called party and the calling party can register their avatar data for their different call conditions, and the avatar data may be registered together with identifiers and phone numbers.

The terminals 10 and 30 do not store opposing party's avatar data. But the terminals 10 and 30 may store the opposing party's avatar data after a call (described later).

The avatar data may include still picture data, moving picture data, text data, etc., as well as avatar data.

The avatar data may be registered in the media server with the first terminal 10, the second terminal 30, a personal computer (PC), or other devices.

In operation S62, the calling party of the first terminal 10 requests a call to the media server 20. The operation of the call request is well known in the art.

In operation S63, the SIP channel connection is set between the first terminal 10 and the media server 20 in response to the call request. After the SIP channel is set, data and control signals can be transmitted between the first terminal 10 and the media server 20.

In operation S64, the first terminal 10 transmits an avatar data forwarding request to the media server 20 through the RTP channel. Since the avatar data of the calling party are already registered in the media server 20, the first terminal 10 can request the media server 20 to send the avatar data of the calling party to the second terminal 30 by transmitting the avatar data forwarding request.

In operation S65, the media server 20 sends a receipt notification message (e.g., a BYE message) to the first terminal 10 through the RTCP channel when the media server 20 receives the avatar data forwarding request. That is, the media server 20 sends the receipt notification message to inform the first terminal 10 that the avatar data forwarding request is successfully received. Therefore, the first terminal 10 can check that its avatar data forwarding request is successfully transmitted to the media server 20.

In operation S66, the media server 20 transmits the avatar data of the calling party from the image database 28 to the second terminal 30 through the RTP channel in response to the avatar data forwarding request. The second terminal 30 may request to open the RTP and RTCP channels between the media server 20 and the second terminal 30 before the avatar data of the calling party are transmitted to the second terminal 30. That is, the called party can open the RTP and RTCP channels by manipulating the second terminal 30, for example, pressing an "ON" button.

In operation S67, the second terminal 30 displays the received avatar data of the calling party. Therefore, the called party of the second terminal 30 can exactly identify the calling party through the displaying avatar data. The second terminal 30 may register the received avatar data of the calling party in the image database 37 to display them instead of repeatedly receiving the avatar data from the media server 20 when the first terminal 10 requests a call again.

In operation S68, the media server 20 asks the second terminal 30 for a call condition through the RTCP channel, and correspondingly the second terminal 30 sends its call condition to the media server 20 through the RTCP channel, such that the media server 20 can check the call condition of the second terminal 30.

The term "call condition" denotes the same meaning as described above.

In operation S69, the media server 20 selects an avatar of the avatar data of the called party corresponding to the checked call condition from the image database 28. Since the avatar data having different avatars, pictures and texts that are previously registered in image database 28 of the media server 20 for different call conditions, the media server 20 can easily select the avatar corresponding to the call condition.

In operation S70, the media server 20 transmits the selected avatar of the called party to the first terminal 10 through the RTP channel.

In operation S71, the first terminal 10 displays the received avatar of the called party. The first terminal 10 may register the received avatar of the called party in its image database 17 for later usage, for the same purpose as is described in operation S67.

In operation S72, the SIP channel connection between the 10 and the media server 20 is released.

Therefore, each of the calling party and the called party can see the avatar of the opposing party when making and answering a call, thereby exactly identifying the opposing party.

If the second terminal 30 accepts the call request of the first terminal 10 in operation S73, communication channel between the first and second terminals 10 and 30 is open for the communication therebetween in operation S74.

After the communication between the terminals 10 and 30, the communication channel is closed as is well known in the art.

As described above, the calling party and called party easily identify the opposing party using the SIP protocol, such that the called party can selectively answer the call depending on the calling party, and the calling party can be informed promptly when dialing a wrong number.

Further, in case the calling party does not register the avatar data in the media server, the calling party can utilize the avatar data of his/her terminal to transmit the avatar to the called party when making a call.

Furthermore, when the called party receives a call at least one time from the calling party, the called party can register the avatar data of the calling party in the terminal for later usage, such that the terminal of the called party can display the registered avatar data instead of repeatedly receiving the avatar data when the same calling party called. In the same way, when the calling party requests a call to the called party, the calling party can register the avatar data received from the called party for later usage instead of repeatedly receiving the avatar data of the called party.

The method and communication system of the present invention provides an easy way of identifying the calling/called party by utilizing the well known SIP protocol without adding additional software and hardware.

It will be apparent to those skilled in the art that various modifications and variations can be made in the present invention. Thus, it is intended that the present invention covers the modifications and variations of this invention provided they come within the scope of the appended claims and their equivalents.

What is claimed is:

[1. A method of identifying a calling party and call conditions of a called party, comprising the steps of:

registering image data of a calling party in at least one a first terminal or a media server;

transmitting the image data and a call request of the first terminal to a second terminal via the media server;

displaying the image data of the calling party on the second terminal;

transmitting image data of the called party previously registered in the media server to the first terminal when at least one of the image data or the call request is transmitted to the media server, wherein the image data of the called party include different images for different call conditions; and displaying the image data of the called party on the first terminal.]

[2. The method according to claim 1, wherein the media server checks the different call condition of the called party, selects an image corresponding to the different call condition from an image database of the media server, and sends the image to the calling party for displaying on a display of the calling party.]

[3. The method according to claim 2, wherein the different call conditions include ready to receive a call, receiving another call, terminal powered off, or incapable of receiving a call.]

[4. The method according to claim 1, wherein the step of transmitting the image data of the called party to the first terminal includes the steps of:

the media server requesting a call condition of the second terminal;

sending the call condition of the second terminal to the media server;

selecting an image corresponding to the call condition from the image data registered in the media server; and transmitting the selected image to the first terminal.]

[5. The method according to claim 1, wherein the image data of the called party transmitted to the first terminal is registered in the first terminal.]

[6. The method according to claim 1, wherein the image data of the calling party transmitted to the second terminal is registered in the second terminal.]

[7. The method according to claim 1, wherein the image data of the calling party are selected from the group consisting of avatar data, still picture data, moving picture data, text data, and combinations thereof.]

[8. The method according to claim 1, wherein the image data of the calling party and the image data corresponding to the different call conditions of the called party are transmitted through RTP (real time transport protocol) channels after SIP (session initiation protocol) channel connections are set between the first terminal and the media server and between the media server and the second terminal.]

[9. A method of identifying another party, comprising the steps of:

registering image data of a calling party and different image data corresponding to call conditions of a called party in a media server;

transmitting a call request and an image data forwarding request of a first terminal to the media server;

transmitting the registered image data of the calling party from the media server to a second terminal in response to the image data forwarding request; and displaying the image data of the calling party on the second terminal.]

[10. The method according to claim 9, further comprising the steps of:

when the image data forwarding request of the first terminal is transmitted to the media server, transmitting the image data corresponding to the call conditions of the called party from the media server to the first terminal; and displaying the image data of the called party on the first terminal.]

[11. The method according to claim 10, wherein the step of transmitting the image data corresponding to th call conditions of the called party to the first terminal includes the steps of:

the media server requesting a call condition of the second terminal;

sending the call condition of the second terminal to the media server;

selecting an image corresponding to the call condition from the media server; and transmitting the selected image to the first terminal.]

[12. The method according to claim 10, wherein the image data of the called party transmitted to the first terminal is registered in the first terminal.]

[13. The method according to claim 9 wherein the image data of the calling party transmitted to the second terminal is registered in the second terminal.]

[14. The method according to claim 9, wherein the image data of the calling party are selected from the group consisting of avatar data, still picture data, moving picture data, text data, and combinations thereof.]

[15. The method according to claim 9, wherein the image data of the calling party and the image data corresponding to the call conditions of the called party are transmitted through RTP channels after SIP channel connections are set between the first terminal and the media server and between the media server and the second terminal.]

[16. A communication system for identifying another party, comprising:

a first terminal having a communication unit for requesting a call, an SIP system for transmitting image data of a calling party and receiving image data corresponding to a call condition of a called party, a display for displaying the image data of the called party, and an image database for registering the image data of the calling party;

a media server having an SIP system for transmitting the image data of the calling party received from the first terminal to the called party and transmitting the image data corresponding to the call condition of the called party to the first terminal, an image database for registering the image data of the called party in accordance with the call condition, and means for selecting one of the image data of the called party corresponding to the call condition; and a second terminal having a communication unit for responding to the call requested from the first terminal to open a communication channel with the first terminal, an SIP system for receiving the image data of the calling party from the first terminal, and a display for displaying the image data of the calling party.]

[17. The communication system according to claim 16, wherein the image data corresponding to different call conditions of the called party are registered in the image database of the media server through the second terminal or other communication means.]

[18. The communication system according to claim 16, wherein the image data of the calling party and the image data corresponding to the call condition of the called party are transmitted through an RTP channel.]

[19. A communication system for identifying another party, comprising:

a first terminal having a communication unit for requesting a call, an SIP system for transmitting an image data forwarding request of a calling party and receiving image data corresponding to a call condition of a called party, and a display for displaying the image data of the called party;

a media server having an SIP system for transmitting the image data of the calling party to the called party in response to the image data forwarding request and transmitting the image data corresponding to a call condition of the called party to the first terminal, an image database for registering the image data in accordance with the call condition, and means for selecting one of the image data of the called party corresponding to the call condition; and a second terminal having a communication unit for responding to the call requested from the first terminal to open a communication channel with the first terminal, an SIP system for receiving the image data of the calling party from the first terminal, and a display for displaying the image data of the calling party.]

[20. The communication system according to claim 19, wherein the registered image data in the image database include the image data of the calling party and the image data corresponding to different call conditions of the called party.]

[21. The communication system according to claim 19, wherein the image data are registered in the image database through the first terminal, the second terminal, or other communication means.]

[22. The communication system according to claim 19, wherein the image data of the calling party and the image data corresponding to the call condition of the called party are transmitted through an RTP channel.]

[23. A method of identifying call conditions of a called party, comprising the steps of:

transmitting a call request of the first terminal to a second terminal via a media server;

transmitting image data of the called party to the first terminal, wherein the image data of the called party include different images for different call conditions; and displaying the image data of the called party on the first terminal.]

[24. A method of identifying another party, comprising the steps of:

registering different image data corresponding to call conditions of a second terminal;

transmitting a call request of a first terminal to the second terminal;

transmitting the registered image data corresponding to the call condition of the second terminal; and displaying the image data received from the second terminal on the first terminal.]

[25. A communication system for identifying another party, comprising:

a first terminal having a communication unit for requesting a call, an SIP system for receiving image data corresponding to a call condition of a called party, and a display for displaying the image data of the called party;

a media server having an SIP system for transmitting the image data corresponding to the call condition of the called party to the first terminal, an image database for registering the image data of the called party in accordance with the call condition, and means for selecting one of the image data of the called party corresponding to the call condition; and a second terminal having a communication unit for responding to the call requested from the first terminal to open a communication channel with the first terminal.]

*26. A digital image display apparatus for controlling a call operation with an external apparatus, the digital image display apparatus comprising:*

*a display unit;*

*a communication unit; and*

*a controller cooperating with the communication unit and configured to:*

*register, in a media server, first image data associated with a user of the digital image display apparatus and at least one second image data for different call conditions for*

*call operations of the digital image display apparatus, wherein the call operations include displaying digital images on the digital image display apparatus;*

*receive, from the media server, third image data including call condition identifying image data for identifying a call condition associated with the external apparatus; and*

*display, on the display unit, the third image data including the call condition identifying image data for a specific call operation directed to the external apparatus.*

*27. The digital image display apparatus of claim 26, wherein the controller is further configured to transmit to the media server a call request for the specific call operation directed to the external apparatus.*

*28. The digital image display apparatus of claim 26, wherein at least one of the first, second, and third image data includes at least one of avatar data, still picture data, moving picture data, text data, or a combination thereof.*

*29. The digital image display apparatus of claim 26, wherein the call condition identified by the call condition identifying image data is ready to receive a call.*

*30. The digital image display apparatus of claim 26, wherein the call condition identified by the call condition identifying image data is incapable of receiving a call.*

*31. A digital image display apparatus for processing a call requested from an external apparatus, the digital image display apparatus comprising:*

*a display unit;*

*a communication unit; and*

*a controller cooperating with the communication unit and configured to:*

*register, in a media server, first image data associated with a user of the digital image display apparatus and at least one second image data for different call conditions for call operations of the digital image display apparatus, wherein the call operations include displaying digital images on the digital image display apparatus;*

*receive, from the external apparatus, a call request for requesting a specific call operation and third image data associated with a caller of the specific call operation;*

*display, on the display unit, the call request and the third image data for the specific call operation received from the external apparatus;*

*receive, from the media server, a call condition request in association with the specific call operation; and*

*transmit, to the media server, a response to the call condition request.*

*32. The digital image display apparatus of claim 31, wherein at least one of the first, second, and third image data includes at least one of avatar data, still picture data, moving picture data, text data, or a combination thereof.*

*33. The digital image display apparatus of claim 31, wherein the different call conditions include ready to receive a call and incapable of receiving a call.*

*34. A method for controlling a call operation of a digital image display apparatus with an external apparatus, the method comprising:*

*registering in a media server, by the digital image display apparatus, first image data associated with a user of the digital image display apparatus and at least one second image data for different call conditions for call operations of the digital image display apparatus, wherein the call operations include displaying digital images on the digital image display apparatus;*

*receiving, by the digital image display apparatus from the media server, third image data including call condition identifying image data for identifying a call condition associated with the external apparatus; and*

*displaying, on a display unit of the digital image display apparatus, the third image data including the call condition identifying image data for a specific call operation directed to the external apparatus.*

*35. A digital image display apparatus for controlling a call operation with an external apparatus, the digital image display apparatus comprising:*

*a display unit;*

*a communication unit; and*

*a controller cooperating with the communication unit and configured to:*

*register, in a media server, first data associated with a user of the digital image display apparatus and at least one second data for different call conditions for call operations of the digital image display apparatus, wherein the call operations include displaying digital images associated with the call operations on the digital image display apparatus;*

*transmit, to the media server, a call request for a specific call directed to the external apparatus;*

*receive, from the media server, call condition identifying data tor identifying a call condition of the specific call directed to the external apparatus in response to the call request; and*

*display, on the display unit, information regarding the call condition of the specific call based on the call condition identifying data.*

*36. A method for controlling a call operation of a digital image display apparatus with an external apparatus, the method comprising:*

*registering, in a media server by the digital image display apparatus, first data associated with a user of the digital image display apparatus and at least one second data for different call conditions for call operations of the digital image display apparatus, wherein the call operations include displaying digital images associated with the call operations on the digital image display apparatus;*

*transmitting, by the digital image display apparatus to the media server, a call request for a specific call directed to the external apparatus;*

*receiving, by the digital image display apparatus from the media server, call condition identifying data for identifying a call condition of the specific call directed to the external apparatus in response to the call request; and*

*displaying, on a display unit of the digital image display apparatus, information regarding the call condition of the specific call based on the call condition identifying data.*

* * * * *